(12) United States Patent
Koch

(10) Patent No.: US 6,331,599 B1
(45) Date of Patent: Dec. 18, 2001

(54) COPOLYMER OF ETHYLENE AND OF AT LEAST ONE ALPHA-OLEFIN AND METHOD FOR OBTAINING SAME

(75) Inventor: Benoît Koch, Hannut (BE)

(73) Assignee: Solvay Pololefins Europe-Belcium, Brussels (BE)

( * ) Notice: Subject to any disclaimer, the term of this patent is extended or adjusted under 35 U.S.C. 154(b) by 0 days.

(21) Appl. No.: 09/284,859

(22) PCT Filed: Oct. 16, 1997

(86) PCT No.: PCT/EP97/05912

§ 371 Date: Apr. 22, 1999

§ 102(e) Date: Apr. 22, 1999

(87) PCT Pub. No.: WO98/18834

PCT Pub. Date: May 7, 1998

(30) Foreign Application Priority Data

Oct. 25, 1996 (BE) .................................................. 09600910

(51) Int. Cl.[7] .............................. C08F 4/24; B01J 23/26
(52) U.S. Cl. .......................... 526/106; 526/130; 526/134; 526/154; 526/348.5; 526/348.6; 502/235; 502/256
(58) Field of Search ................. 526/97, 129, 130, 526/348.6, 106, 348.5, 154; 502/113, 117, 114, 154, 235, 256

(56) References Cited

U.S. PATENT DOCUMENTS

| | | |
|---|---|---|
| 4,801,572 | 1/1989 | Hsieh . |
| 5,208,309 | 5/1993 | McDaniel et al. . |
| 5,236,998 | 8/1993 | Lundeen et al. . |
| 5,401,820 * | 3/1995 | McDaniel et al. ................ 526/348.6 |
| 5,405,819 | 4/1995 | Mueller et al. . |
| 5,648,439 * | 7/1997 | Bergmeister et al. ................ 526/96 |
| 5,834,572 | 11/1998 | Derleth et al. . |
| 5,849,852 * | 12/1998 | Koch et al. ............................. 526/96 |
| 5,863,854 * | 1/1999 | Grosjean et al. ..................... 502/117 |
| 5,894,852 | 12/1998 | Koch et al. . |
| 6,013,595 * | 1/2000 | Lhost et al. .......................... 502/113 |

FOREIGN PATENT DOCUMENTS

| | | |
|---|---|---|
| 42 28 883 A1 | 3/1994 | (DE) . |
| 0 712 868 | 5/1996 | (EP) . |
| WO 94/26790 | 11/1994 | (WO) . |
| WO 94/26791 | 11/1994 | (WO) . |

* cited by examiner

Primary Examiner—David W. Wu
Assistant Examiner—R. Harlan

(57) ABSTRACT

Copolymer of ethylene and of at least one alpha-olefin obtained by means of a catalytic solid base on chromium oxide deposited on an inorganic support, the said copolymer having a melt flow index HLMI, measured in g/10 min, an amount of alpha-olefin Q, pressed in g of alpha-olefin per kg of copolymer, a standard density SD, measured in kg/m³, at least equal to (952.75+5.40×log HLMI−0.79×Q) and a relatively broad molecular mass distribution, characterized by a ratio of the dynamic viscosities $\mu_0/\mu_2$ at least equal to (23.67−6.67×log HLMI).

18 Claims, 1 Drawing Sheet

Figure 1:
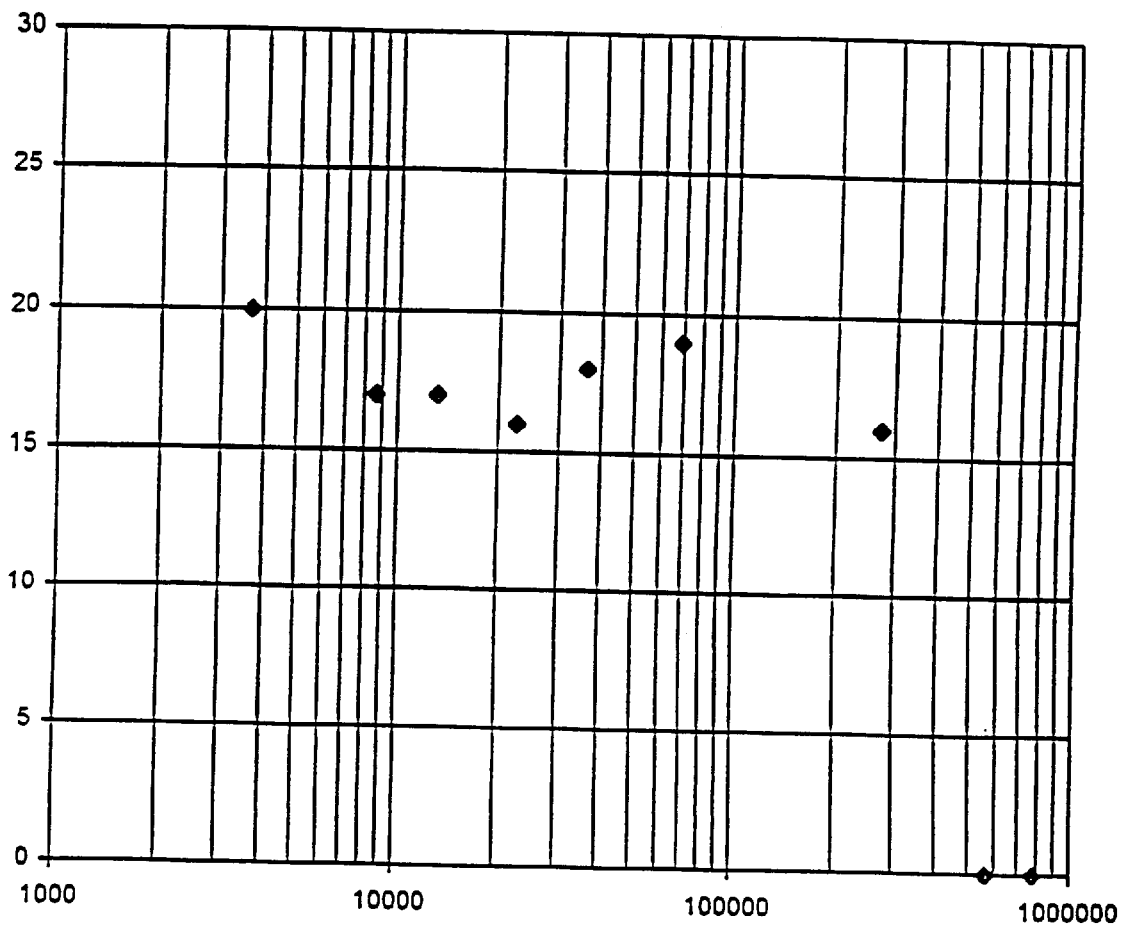

COPOLYMER OF ETHYLENE AND OF AT LEAST ONE ALPHA-OLEFIN AND METHOD FOR OBTAINING SAME

The present invention relates to copolymers of ethylene and of at least one alpha-olefin exhibiting an advantageous combination of characteristics which renders them particularly suited to processing by extrusion and extrusion-blow moulding and more particularly to the manufacture of articles exhibiting good resistance to stress cracking. It also relates to a process for producing these copolymers.

It is known that the resistance to cracking of a polyethylene increases by incorporating an alpha-olefin therein. However, the maximum amount of alpha-olefin which can be incorporated in polyethylene is limited because its incorporation results in a decrease in the standard density of polyethylene and consequently a decline in the mechanical properties, such as the stiffness. Furthermore, when, in the presence of a chromium catalyst, a small amount of alpha-olefin is incorporated in polyethylene the incorporation does not always occur homogeneously, in particular with regard to chains of high molecular mass.

U.S. Pat. No. 5,236,998 provides a solution to this problem by preparing an ethylene copolymer comprising three polyethylene fractions, of which only the fraction of high molecular weight comprises the alpha-olefin, by means of a Ziegler-Natta catalyst in two reactors arranged in parallel, the first of which only comprises ethylene, at high temperature, and the second of which comprises an ethylene/alpha-olefin mixture, at lower temperature, and then the polymerization is continued in a third reactor, in which the polymers resulting from the two reactors are combined. Such a process is difficult to carry out industrially and produces a heterogeneous mixture of resins comprising residual chlorine originating from the catalyst.

Furthermore, it is known that copolymers comprising fewer catalytic residues and more particularly comprising very little chlorine can be obtained by means of catalysts based on chromium oxide deposited on a support (generally known as chromium catalysts). It is also known that ethylene polymers obtained with catalysts of this type have a better melt strength than polymers obtained by means of Ziegler-Natta catalysts. However, the use of conventional chromium catalysts in a process for the copolymerization of ethylene and of at least one alpha-olefin in a single stage does not make it possible to incorporate the alpha-olefin homogeneously in the copolymer and more particularly in the chains of higher molecular weight. In addition, the copolymers produced by means of conventional chromium catalysts do not have, for a given melt flow index, both a high standard density and a high alpha-olefin content. Furthermore, the copolymers produced by means of conventional chromium catalysts in single-stage polymerization processes have a relatively narrow distribution of molecular masses and a ratio of the dynamic viscosities $\mu_0/\mu_2$ which are only adjustable within narrow limits.

The present invention is targeted at overcoming the abovementioned disadvantages by providing ethylene copolymers, obtained by means of a catalytic solid based on chromium oxide, which exhibit, for a given melt flow index, a better compromise between the standard density and the alpha-olefin content and which also exhibit a relatively broad distribution of the molecular masses.

The invention consequently relates to a copolymer of ethylene and of at least one alpha-olefin obtained by means of a catalytic solid based on chromium oxide, the said copolymer having a melt flow index HLMI, expressed in g/10 min, an amount of alpha-olefin Q, expressed in g of alpha-olefin per kg of copolymer, a standard density SD, expressed in kg/m³, and dynamic viscosities $\mu_0$ and $\mu_2$ measured at 190° C., respectively at rate gradients of 1 and 100 s⁻¹, corresponding to the relationships $$SD \geq (952.75 + 5.40 \times \log HLMI - 0.79 \times Q),$$

and $$\mu_0/\mu_2 \geq (23.67 - 6.67 \times \log HLMI).$$

For the purposes of the present invention, the term "copolymers of ethylene and of at least one alpha-olefin" is understood to denote copolymers comprising monomer units derived from ethylene and monomer units derived from one or more alpha-olefins and comprising at least 90%, in particular at least 95%, by weight of monomer units derived from ethylene. The copolymers according to the invention preferably comprise at least 97% by weight of monomer units derived from ethylene. The copolymers composed essentially of monomer units derived from ethylene and of monomer units derived from one or more alpha-olefins are particularly preferred.

The alpha-olefins are generally chosen from those comprising from 3 to 12 carbon atoms, more particularly from those comprising from 3 to 8 carbon atoms. Good results have been obtained with 1-butene and/or 1-hexene. The copolymers of ethylene and of 1-hexene are very particularly preferred.

For the purposes of the present invention, the alpha-olefin content Q is expressed in g of alpha-olefin per kg of copolymer. It is measured by $^{13}C$ NMR according to the method described in J. C. Randall, JMS-Rev. Macromol. Chem. Phys., C29(2&3), p. 201–317 (1989), that is to say that the content of units derived from the alpha-olefin is calculated from the measurements of the integrals of the lines characteristic of the alpha-olefin with respect to the integral of the line characteristic of the units derived from ethylene (30 ppm).

The alpha-olefin content in the copolymer according to the invention is generally at least 1 g per kg of polymer, in particular at least 4 g/kg, values of at least 6 g/kg being favourable. The alpha-olefin content is usually at most 100 g/kg, preferably at most 50 g/kg, of polymer. An alpha-olefin content which does not exceed 30 g/kg is particularly preferred.

One of the essential characteristics of the copolymer according to the invention is therefore that it exhibits, for a given melt flow index HLMI and a given alpha-olefin content Q, a higher SD than known ethylene copolymers. In the context of the present invention, the standard density SD is measured according to ASTM Standard D 792. The SD is measured on a sample prepared according to ASTM Standard D 1928, Procedure C. The SD of the copolymer according to the invention is preferably at least equal to (952.75+5.40×log HLMI−0.70×Q). Copolymers exhibiting an SD at least equal to (952.75+5.40×log HLMI−0.63×Q) are particularly preferred.

The copolymers according to the invention usually exhibit an SD of greater than 935 kg/m³. Copolymers which have given good results are those in which the SD is at least equal to 940 kg/M³, more particularly those in which the SD is at least equal to 945 kg/m³. The SD of the copolymers according to the invention generally does not exceed 965 kg/M³ and it preferably does not exceed 962 kg/m³. Copolymers in which the SD does not exceed 959 kg/M³ are particularly preferred.

The copolymers according to the invention generally exhibit a melt flow index HLMI, measured at 190° C. under a load of 21.6 kg according to ASTM Standard D 1238, Condition F (1986), which does not exceed 100 g/10 min and generally does not exceed 50 g/10 min. The HLMI is generally at least 0.1 g/10 min, in particular at least 0.5 g/10 min.

Another essential characteristic of the copolymers according to the invention is their relatively broad distribution of molecular masses, characterized by a ratio $\mu_0/\mu_2$, between the dynamic alpha-olefin and process for its production viscosities $\mu_0$ and $\mu_2$ measured at 190° C., respectively at rate gradients of 1 and 100 s$^{-1}$, of greater than or equal to (23.67–6.67×log HLMI). In the context of the present invention, the dynamic viscosity $\mu_2$ is determined by extrusion of the polymer at 190° C. through a die with a length of 15 mm and a diameter of 1 mm at a constant rate corresponding to a rate gradient of 100 s$^{-1}$ and by measuring the force transmitted by the piston during its descent. The dynamic viscosity $\mu_2$ is then calculated by the relationship $\mu_2$=233×Fp, in which Fp represents the mean force exerted by the piston during the measurement period of 30 seconds, expressed in daN. The cylinder and the piston of the rheometer used for this measurement correspond to the criteria of that used for the measurement of the melt flow index according to ASTM Standard D 1238 (1986). In the context of the present invention, the dynamic viscosity $\mu_0$ is determined by the extrapolation, to a rate gradient of 1 s$^{-1}$, of the dynamic viscosity measurements carried out at rate gradients of 7 to 3000 s$^{-1}$ according to the method described above for $\mu_2$.

The copolymers according to the invention generally exhibit a ratio $\mu_0/\mu_2$ at least equal to 10, more particularly at least equal to 12. The ratio $\mu_0/\mu_2$ usually does not exceed 50.

Furthermore, the ethylene copolymers according to the invention have a die swell (DS) which is generally at least 1.3 and preferably at least 1.45. Copolymers which exhibit a DS of at least 1.55 are particularly preferred. In the context of the present invention, the die swell is determined by extrusion of the polymer at 190° C. and at a rate gradient of 100 s$^{-1}$ through a die with a length of 15 mm and with a diameter of 1 mm at a constant rate and by measuring the displacement of the piston necessary to extrude a 70 mm rod. The die swell is then calculated by the relationship DS=0.5707√e, in which e represents the displacement of the piston, expressed in mm. The cylinder and the piston of the rheometer used for this measurement correspond to the criteria of that used for the measurement of the melt flow index according to ASTM Standard D 1238 (1986).

The copolymers according to the invention are generally characterized by homogeneous incorporation of the alpha-olefin in the chains of different molecular mass. The homogeneity of the incorporation of the alpha-olefin can be characterized by the fractionation of the copolymer and by the determination of the alpha-olefin content for each fraction of different molecular mass. The graph in FIG. 1 gives, on the ordinate, the alpha-olefin content for, on the abscissa, fractions of different molecular masses present in a copolymer according to the invention. The copolymers according to the invention generally comprise fractions with molecular masses varying from 5000 to 500,000, each comprising an alpha-olefin content, expressed in g/kg, of 0.75×Q to 1.25×Q, Q being the alpha-olefin content of the copolymer.

The copolymers according to the invention are usually characterized by high incorporation of the alpha-olefin in the chains of high molecular mass. The copolymers according to the invention generally comprise fractions with molecular masses varying from 100,000 to 500,000, each comprising an alpha-olefin content of greater than 0.8×Q, more particularly of greater than 0.9×Q.

The copolymers according to the present invention generally comprise less than 10 ppm of chlorine. They generally comprise less than 5 ppm of chlorine.

The present invention also relates to a process which is particularly well suited to the preparation of the copolymers of ethylene and of at least one alpha-olefin described above. This process consists in polymerizing, in a single stage, ethylene and optionally one or more alpha-olefins as defined above in the presence of a catalytic solid based on chromium oxide deposited on a homogeneous and amorphous support, comprising at least two constituents chosen from silica (X), alumina (Y) and aluminium phosphate (Z), and of a cocatalyst chosen from organoboron compounds.

The catalytic solid based on chromium oxide deposited on a homogeneous and amorphous support, comprising at least two constituents chosen from silica (X), alumina (Y) and aluminium phosphate (Z), is known and has been disclosed in Patent Applications WO 94/26790, WO 94/26791 and EP-A-0,712,868, the contents of which are incorporated by reference. It is generally obtained by impregnation or by mixing of the support with a chromium compound, followed by activation at a temperature of 400 to 1000° C. in an oxidizing atmosphere, so as to convert at least a portion of the chromium to hexavalent chromium.

The amount of chromium present in the catalytic solid is generally from 0.05 to 10% by weight, preferably from 0.1 to 5% by weight, more particularly from 0.25 to 2% by weight, with respect to the total weight of the catalytic solid.

The support advantageously exhibits a specific surface (SS), measured according to the BET volumetric method (British Standard BS 4359/1-1984), of at least 100 m$^2$/g, in particular of at least 180 m$^2$/g, values of at least 220 m$^2$/g being the most favourable. The SS is generally at most 800 m$^2$/g, more specifically at most 700 m$^2$/g, values of at most 650 m$^2$/g being the most common.

The support generally exhibits a crystallization temperature of at least 700° C., such as, for example, of at least 1000° C. The crystallization temperature of the support is determined by subjecting a sample of the support to a heat treatment at different temperatures and by examining the sample by X-ray diffraction after each heat treatment.

In addition, the pore volume of the support (PV) is usually at least 1.5 cm$^3$/g, values of at least 1.7 m$^3$/g being recommended. The PV is generally at most 5 cm$^3$/g, in particular at most 4.5 cm$^3$/g, values of at most 4 cm$^3$/g being common. The pore volume (Pv) is the sum of the pore volume composed of the pores with a radius of less than or equal to 75 A, measured by the nitrogen penetration method (BET method) (British Standard BS 4359/1-1984), and of the pore volume measured by the mercury penetration method by means of a porosimeter of Poro 2000 type, sold by Carlo Erba Co. (Belgium Standard NBN B 05-202-1976).

The supports used generally exhibit an SS and a PV, expressed respectively in m$^2$/g [lacuna] in cm$^3$/g, such that SS<(PV×564−358). Preferred supports exhibit an SS and a PV such that SS <(PV×682−542). Supports which exhibit an SS and a PV such that SS≦(PV×682−573) are particularly preferred.

The support as described above can advantageously be obtained according to the process disclosed in Patent Applications WO 94/26790 and EP-A-0,712,868, which consists in mixing, in a first stage, an alcohol, water, a silicon alkoxide and an acid in amounts such that the water/silicon molar ratio is from 2 to 50, in adding, to the hydrolysis medium thus obtained, in a second stage, an acidic solution of an aluminium compound and/or a solution of a source of phosphate ions and, in a third stage, a precipitating agent, in order to obtain a precipitate, which is washed, in a fourth stage, with water and then with an organic liquid, and dried, in a fifth stage, by distillation until a powder is obtained, which powder is calcined. Another process for the preparation of the homogeneous and amorphous support consists in mixing, in a first stage, a source of silica, chosen from aqueous alkaline silica sols and aqueous alkaline inorganic silicate solutions, with a source of phosphate ions with a pH of less than 5, the pH of the medium being maintained at less than 5 throughout the duration of the first stage, in adding, in a second stage, an aluminium compound to the medium resulting from the first stage, and in forming, in a third stage, a precipitate by adding a precipitating agent to the medium of the second stage, the pH of the precipitation medium being maintained at greater than or equal to 5 throughout the duration of the third stage, and in drying the precipitate until a powder is obtained, and in then calcining the powder.

The catalytic solid which has given good results in the process according to the invention comprises from 0.05 to 10% by weight of chromium and the support comprises silica (X), alumina (Y) and aluminium phosphate (Z) in an (X):(Y):(Z) molar percentage of (10 to 95):(1 to 80):(1 to 85) and more particularly in an (X):(Y):(Z) molar percentage of (20 to 80):(0.5 to 60):(5 to 60).

The polymerization process according to the invention is carried out in the presence of a cocatalyst chosen from organoboron compounds. Organoboron compounds which are particularly well suited are trialkylboranes and more particularly those in which the alkyl chains comprise from 1 to 12 carbon atoms, preferably from 2 to 6 carbon atoms. Triethylborane gives good results.

The amount of cocatalyst employed is generally from 0.02 to 50 mmol per liter of solvent, of diluent or of reactor volume.

The amounts of solid catalyst and of cocatalyst employed in the process according to the invention are generally such that the molar ratio of the organoboron compound to the chromium present in the catalytic solid is at least 0.1 and more particularly at least 0.8. In addition, this ratio is favourably at most 20 and more particularly at most 10.

The polymerization process according to the invention can be carried out according to any known single-stage process. It is preferably carried out in suspension in an aromatic, cycloaliphatic or aliphatic hydrocarbon-comprising diluent at a temperature such that at least 80% by weight of the copolymer formed is insoluble in this diluent. The diluent used is preferably a linear alkane, such as n-butane, n-hexane or n-heptane, or a branched alkane, such as isobutane, isopentane or 2,2-dimethylpropane. The diluent is preferably isobutane.

The polymerization temperature is generally at least 55° C., preferably at least 65° C. The polymerization temperature generally does not exceed 150° C. and preferably does not exceed 110° C.

The ethylene pressure in the polymerization reactor is generally chosen between atmospheric pressure and 5 MPa. The ethylene pressure is preferably at least equal to 0.3 MPa and more particularly at least equal to 0.4 MPa. The ethylene pressure generally does not exceed 2 MPa and more particularly does not exceed 1.5 MPa. In the specific case where the polymerization is carried out in suspension in a diluent, the pressure of the ethylene is generally adjusted so that the concentration of ethylene in this diluent is at least 1 molar %, preferably at least 3 molar %. The pressure of the ethylene is generally adjusted so that the concentration of ethylene in the diluent does not exceed 20 molar % and preferably does not exceed 10 molar %.

The amount of alpha-olefin employed in the polymerization process according to the invention depends on the amount of alpha-olefin desired in the copolymer. It has been observed that, in the polymerization process according to the invention, even without addition of alpha-olefins to the polymerization medium, ethylene copolymers comprising a small amount of units derived from alpha-olefins have been encountered. This effect might be explained by the in situ production of small amounts of alpha-olefins comprising at least 4 carbon atoms, which would be incorporated in the growing polymerization chain. The process according to the invention can consequently be carried out without addition of alpha-olefins to the polymerization reactor. However, and more particularly in the case where copolymers which are richer in alpha-olefins are desired, alpha-olefins as defined above are added to the polymerization reactor. In this case, the amount of alpha-olefins employed is generally adjusted so that the alpha-olefin/ethylene molar ratio is at least 0.005. The amount of alpha-olefin is preferably adjusted so that this ratio is at least 0.01 and more particularly at least 0.03. The amount of alpha-olefin is usually adjusted so that the alpha-olefin/ethylene molar ratio does not exceed 0.8. This ratio preferably does not exceed 0.5 and more particularly does not exceed 0.4.

The polymerization process according to the invention can be carried out in the presence of a transfer agent, such as, for example, hydrogen.

The process according to the invention makes it possible to obtain a high catalytic activity and, in addition, it makes it possible to obtain copolymers having a low content of oligomers.

The process according to the invention has the advantage of exhibiting a very low, indeed even zero, induction period.

The copolymers according to the invention are well suited to the melt shaping of highly varied articles. To this end, the copolymers are generally mixed with the usual additives for processing polyolefins, such as stabilizers (antioxidizing agents and/or UV stabilizers), antistatic agents and processing aids, as well as pigments.

The invention consequently also relates to a composition comprising a copolymer according to the invention and at least one of the additives described above. The content of additives in the composition is in general less than 10 and generally less than 5 parts per 100 parts by weight of copolymer.

Compositions comprising at least 95%, preferably at least 99%, by weight of a copolymer are particularly preferred.

The examples which follow are intended to illustrate the invention.

The meaning of the symbols used in these examples and the units expressing the quantities mentioned and the methods for measuring these quantities are explained belo α=catalytic activity, expressed as g of copolymer obtained per hour and per g of catalyst employed, divided by the concentration of the ethylene in the isobutane.

FO=content of oligomers in the polymer, expressed as g of oligomers per kg of copolymer and measured by extraction with hexane at its boiling temperature.

Q=content of hexene in the copolymer, measured as described above, the content of units derived from 1-hexene being calculated from the measurements of the integrals of the lines characteristic of the units derived from 1-hexene (23.4, 34.9 and 38.1 ppm) with respect to the integral of the line characteristic of the units derived from ethylene (30 ppm).

ESCR-A=the resistance to slow cracking is measured according to ASTM Standard D 1693 and is expressed in hours.

The other properties, HLMI, SD, $\mu_0/\mu_2$ and DS, were explained in the description.

EXAMPLE 1

In Accordance With the Invention

In this example, a catalytic solid comprising 0.7% by weight of chromium on a support comprising 50.4 molar % of $SiO_2$, 1.8 molar % of $Al_2O_3$ and 47.8 molar % of $AlPO_4$ and exhibiting a specific surface of 293 m$^2$/g and a pore volume of 3.17 cm$^3$/g was employed. The preparation of such a support has been disclosed in Examples 1, 4 and 5 of Patent Application EP-A-0,712,868. The catalytic solid was prepared by mixing the support with chromium acetylacetonate, by then treating the mixture in a fluidized bed at 150° C. for 2 hours while flushing with air, and by subsequently calcining it in the fluidized bed at 595° C. for 10 h under dry air.

The polymerization was carried out in isobutane in the presence of this catalytic solid and an amount of triethylborane (TEB), so as to obtain the TEB/Cr molar ratio given in Table I. The temperature was raised and ethylene was introduced into the reactor, so as to obtain a concentration in the isobutane given in Table I. An amount of 1-hexene was introduced, so as to obtain a 1-hexene/ethylene molar ratio given in Table I. This ethylene/hexene molar ratio was kept constant throughout the duration of polymerization. After the polymerization, the copolymer was recovered.

The polymerization conditions, the results obtained and the properties of the copolymer are collated in Table I.

The copolymer obtained in Example 1 was fractionated and the hexene contents in different fractions having different molecular masses were measured. The graph in FIG. 1 gives the hexene contents (on the ordinate), expressed in g/kg, of the different fractions (on the abscissa). It is seen from this that the fractions with molecular masses varying from 5000 to 500,000 each comprise a hexene content of 16 to 20 g/kg and that the fractions with molecular masses varying from 100,000 to 500,000 comprise a hexene content of approximately 16 g/kg.

EXAMPLE 2

In Accordance With the Invention

In this example, the polymerization was carried out in isobutane with a catalytic solid comprising 0.7% by weight of chromium on a support comprising 52.3 molar % of $SiO_2$, 2.2 molar % of $Al_2O_3$ and 45.5 molar % of $AlPO_4$ and exhibiting a specific surface of 297 m$^2$/g and a pore volume of 2.2 cm$^3$/g. The catalytic solid was prepared by mixing the support with chromium acetylacetonate, by then treating the mixture in a fluidized bed at 150° C. for 2 hours while flushing with air and by subsequently calcining it in the fluidized bed at 595° C. for 10 h under dry air.

The polymerization conditions, the results obtained and the properties of the copolymer are collated in Table I.

EXAMPLES 3 and 4

In Accordance With the Invention n these examples, the polymerization was carried out in isobutane with the catalytic solid described in Example 1, except that it was calcined at 700° C. for 16 h under dry air.

The polymerization conditions, the results obtained and the properties of the copolymer are collated in Table I.

EXAMPLE 5R

Not in Accordance With the Invention

This example was carried out by means of the catalytic solid described in Example 1 but in the absence of triethylborane. The properties of the copolymer obtained are collated in Table I. It is seen from this that the copolymer obtained exhibits, for an alpha-olefin content of 11 g/kg, a lower SD than the copolymer of Example 1, which comprises more copolymer.

EXAMPLE 6R and 7R

Not in Accordance With the Invention

These examples were carried out by means of a conventional Cr catalyst, comprising 1% of chromium on a silica support (Cogel 963, sold by the company Grace), instead of the catalytic solid of Example 1. The properties of the copolymer obtained are collated in Table I. It is seen from this that the copolymer obtained in Example 6R exhibits, for a comparable SD, an alpha-olefin content which is markedly lower than that of the copolymers of Examples 1 and 4, as well as a narrower distribution of the molecular masses ($\mu_0/\mu_2$ ratio).

Table I also shows that the copolymer obtained in Example 7R exhibits, for a comparable SD, an alpha-olefin content which is markedly lower than that of the copolymer of Example 2 and consequently exhibits a poorer resistance to slow cracking.

TABLE 1

| Example | 1 | 2 | 3 | 4 | 5R | 6R | 7R |
|---|---|---|---|---|---|---|---|
| TEB/Cr (mol/mol) | 1 | 0.89 | 2 | 2 | 0 | 0 | 0 |
| Ethylene/isobutane (molar %) | 7 | 8 | 9 | 9 | 7 | 7 | 10 |
| Polymerization T (° C.) | 82 | 94 | 80 | 70 | 97 | 94 | 92 |
| Hexene/ethylene (mol/mol) | 0.263 | 0.041 | 0.10 | 0.30 | 0.051 | 0.04 | 0.011 |
| α (g/g cata/h) | 6660 | 8000 | 2840 | 2560 | 6500 | 3000 | 3800 |
| FO (g/kg) | 34 | 20 | 28 | 30 | 15 | 11 | — |
| Q (g/kg) | 16 | 8 | 7 | 14 | 11 | 5 | 1 |
| HLMI (g/10 min) | 26.3 | 5.7 | 21 | 18.1 | 11.2 | 10.8 | 3.6 |
| SD (kg/m$^3$) | 949.7 | 954.4 | 956.6 | 950.7 | 948.5 | 951.2 | 954 |
| $\mu_0/\mu_2$ | — | — | 16 | 17.4 | — | 10.04 | — |
| DS | — | — | 2.2 | 2.3 | — | 1.65 | — |
| ESCR-A (h) | — | >500 | — | — | — | — | 450 |

What is claimed is:

1. A copolymer of ethylene and of at least one alpha-olefin obtained by means of a catalytic solid based on chromium oxide, the said copolymer having a melt flow index HLMI, expressed in g/10 min, an amount of alpha-olefin Q, expressed in g of alpha-olefin per kg of copolymer, a standard density SD, expressed in kg/m$^3$, and dynamic viscosities $\mu_0$ and $\mu_2$ measured at 190° C., respectively at rate gradients of 1 and 100 s$^{-1}$, corresponding to the relationships SD$\geq$(952.75+5.40×log HLMI−0.79×Q), and $\mu_0/\mu_2 \geq$(23.67−6.67×log HLMI).

2. The copolymer according to claim 1, wherein the SD is at least equal to (952.75+5.40×log HLMI−0.79×Q).

3. The copolymer according to claim 1, wherein the alpha-olefin comprises from 3 to 12 carbon atoms.

4. The copolymer according to claim 3, wherein the alpha-olefin is 1-butene and/or 1-hexene.

5. The copolymer according to claim 1, wherein the amount of alpha-olefin Q is at least equal to 1 g/kg and does not exceed 100 g/kg of copolymer.

6. The copolymer according to claim 1, wherein the SD is greater than 935 kg/m$^3$ and does not exceed 965 kg/m$^3$.

7. The copolymer according to claim 1, wherein the HLMI is at least equal to 0.1 g/10 min and does not exceed 100 g/10 min.

8. The copolymer according to claim 1, wherein the ratio $\mu_0/\mu_2$ is at least equal to 10 and does not exceed 50.

9. The copolymer according to claim 1, said copolymer having a die swell (DS) of at least 1.3.

10. A process for the preparation of ethylene copolymer in accordance with claim 1, wherein ethylene and at least one alpha-olefin are polymerized in a single stage, optionally in the presence of hydrogen, in the presence of a catalytic solid based on chromium oxide deposited on a homogenous and amorphous support, the said support comprising silica, alumina and aluminum phosphate, said support being obtained by co-precipitation of precursor components of said support and a co-catalyst chosen from organoboron compounds, wherein the catalytic solid comprises from 0.05 to 10% by weight of chromium and the support comprises silica (X), alumina (Y) and aluminum phosphate (Z) in an (X):(Y):(Z) molar percentage of (10 to 95):(1 to 80):(1 to 85).

11. The process according to claim, 10 wherein the catalytic solid comprises from 0.05 to 10% by weight of chromium and the support comprises silica (X), alumina (Y) and aluminium phosphate (Z) in an (X):(Y):(Z) molar percentage of (20 to 80):(0.5 to 60):(5 to 60).

12. The process according to claim 10, wherein the organoboron compound is a trialkylborane in which the alkyl chains comprise from 1 to 12 carbon atoms.

13. The process according to claim, 12 wherein the trialklborane is triethylborane.

14. A composition comprising at least one additive selected from the group consisting of stabilizers, antioxidizing agents, processing aids and pigments and at least 95% by weight of a copolymer in accordance with claim 1.

15. An melt-shaped article comprising a composition according to claim 14.

16. The process of claim 10 wherein the support is a coprecipiate formed by precipitating an admixture comprising a support source selected from the group consisting of silicon alkoxide, a source of aluminum and a source of phosphate.

17. The process of claim 16, wherein the precipitate is produced by mixing a silicon alkoxide and an acid in a hydrolysis medium; adding to the hydrolysis medium a source of phosphate ions; and adding a precipitating reagent to the phosphate containing hydrolysis medium.

18. The process of claim 16, wherein the precipitate is formed by mixing an inorganic silicate source with a source of phosphate at a pH of less than 5 and adding a precipitating agent at a pH of greater than 5.

* * * * *

UNITED STATES PATENT AND TRADEMARK OFFICE
CERTIFICATE OF CORRECTION

PATENT NO. : 6,331,599 B1
DATED : December 18, 2001
INVENTOR(S) : Koch

It is certified that error appears in the above-identified patent and that said Letters Patent is hereby corrected as shown below:

<u>Title page,</u>
Item [73], change to read:
-- Solvay Polyolefins Europe-Belgium, Brussels (BE) --

Signed and Sealed this

Twenty-fifth Day of February, 2003

JAMES E. ROGAN
*Director of the United States Patent and Trademark Office*